· US010140961B2

United States Patent
Tichauer et al.

(10) Patent No.: US 10,140,961 B2
(45) Date of Patent: Nov. 27, 2018

(54) SYSTEMS AND METHODS FOR CONTROLLING A DISPLAY SCREEN OF A PORTABLE COMPUTING DEVICE

(71) Applicant: VONAGE BUSINESS INC., Atlanta, GA (US)

(72) Inventors: Royee Tichauer, Haifa (IL); Reut Yedidim, Rosh-Haayin (IL)

(73) Assignee: VONAGE BUSINESS INC., Atlanta, GA (US)

( * ) Notice: Subject to any disclaimer, the term of this patent is extended or adjusted under 35 U.S.C. 154(b) by 87 days.

(21) Appl. No.: 15/358,844

(22) Filed: Nov. 22, 2016

(65) Prior Publication Data
US 2017/0076699 A1    Mar. 16, 2017

Related U.S. Application Data

(63) Continuation-in-part of application No. 14/265,892, filed on Apr. 30, 2014, now Pat. No. 9,501,813.

(51) Int. Cl.
G09G 5/38 (2006.01)
G09G 5/00 (2006.01)
G06F 3/0346 (2013.01)
G06F 1/16 (2006.01)

(52) U.S. Cl.
CPC ............ *G09G 5/38* (2013.01); *G06F 1/1694* (2013.01); *G06F 3/0346* (2013.01); *G09G 5/003* (2013.01); *G06F 2200/1614* (2013.01); *G06F 2200/1637* (2013.01); *G09G 2320/08* (2013.01); *G09G 2340/0492* (2013.01); *G09G 2340/14* (2013.01)

(58) Field of Classification Search
CPC ... G06F 2200/1614; G06T 3/006; G06T 3/60; G09G 2340/0492
See application file for complete search history.

(56) References Cited

U.S. PATENT DOCUMENTS

| 2003/0085870 A1 * | 5/2003 | Hinckley | G06F 1/1626 345/156 |
| 2006/0103733 A1 | 5/2006 | Grady et al. | |
| 2009/0207184 A1 | 8/2009 | Laine et al. | |
| 2013/0069989 A1 * | 3/2013 | Nagata | G09G 3/20 345/659 |

FOREIGN PATENT DOCUMENTS

EP    2 312 416 A1    4/2011

* cited by examiner

*Primary Examiner* — Michelle L Sams
(74) *Attorney, Agent, or Firm* — FisherBroyles, LLP

(57) ABSTRACT

A system and method for controlling how images are displayed on a display screen of a portable computing device changes the orientation of the images on the display screen when the orientation of the portable computing device changes. The portable computing device is determined to have changed its orientation when it tilts beyond a reference angle that separates a first orientation from a second orientation. If the portable computing device is rapidly tilting back and forth across the reference angle, the value of the reference angle is changed to be either larger or smaller. This prevents the images from rapidly switching back and forth between two different display orientations on a display screen of the portable computing device.

14 Claims, 6 Drawing Sheets

SYSTEMS AND METHODS FOR CONTROLLING A DISPLAY SCREEN OF A PORTABLE COMPUTING DEVICE

This application is a continuation-in-part of application Ser. No. 14/265,892, which was filed on Apr. 30, 2014, the contents of which are incorporated herein by reference.

BACKGROUND OF THE INVENTION

The invention is related to the display of images on a display screen of a portable computing device. More specifically, the invention is related to systems and methods for switching an orientation of images appearing on a display screen of a portable computing device when an orientation of the portable computing device itself is changed.

Portable computing devices, such as smart phones, typically include a display screen. Many portable computing devices are configured such that an orientation of the images that appear on the display screen can change when an orientation of the portable computing device itself changes.

FIGS. 1A and 1B illustrate a smart phone 100 in first and second orientations, respectively. The smart phone 110 includes a speaker aperture 140 towards one end of the smart phone 110 which is located so that it will be adjacent a user's ear when the smart phone 110 is held adjacent to one side of a user's head during a telephone call. A control button 130 is located at the other end of the smart phone 110. A display screen 120 is located between the speaker aperture 140 and the control button 130.

FIGS. 1A and 1B depict an e-mail message on the display screen 120 of the smart phone 110. When the smart phone 110 is in a first orientation, as illustrated in FIG. 1A, the e-mail message appears on the display screen 120 in a first orientation. When the smart phone 110 is rotated 90° counterclockwise to a second orientation, a display unit of the smart phone 110 causes the image of the e-mail message to appear on the display screen 120 in a second orientation. This change in the orientation of the image appearing on the display screen 120 is made to help a user to view the image. The assumption is that the user will find it easier to view of the image if the image is always orientated the same way, regardless of the orientation of the smart phone 110 and its associated display screen.

One or more orientation sensors in the smart phone 110 sense when the orientation of the smart phone 110 changes from the first orientation illustrated in FIG. 1A to the second orientation illustrated in FIG. 1B. When the orientation sensor(s) detect the change in orientation of the smart phone, a display unit of the smart phone 110 causes the images appearing on the display screen 120 to change from the first orientation illustrated in FIG. 1A to the second orientation in FIG. 1B.

There is typically a small time lag between the time that the orientation of the smart phone 110 changes and the time that the display unit causes the orientation of the images on the display screen 120 to change. This delay can be due, at least in part, to the time required for the orientation sensor(s) to detect and register the change in orientation of the smart phone 110, and for this information to be passed along to the display unit. Also, the display unit itself may require some time to cause a corresponding change in the orientation of the images on the display screen 120.

Because there are a wide range of tilted positions at which the smart phone 110 could be held by a user between the orientation illustrated in FIG. 1A and the orientation illustrated in FIG. 1B, the orientation sensor(s) are typically designed to report a change from the first orientation to the second orientation only after the smart phone 110 has been rotated a predetermined number of degrees counterclockwise from the position illustrated in FIG. 1A. This predetermined number of degrees could be 45°, or some other amount. Likewise, when the smart phone starts in the position illustrated in FIG. 1B and begins to rotate clockwise, the orientation sensor(s) are typically configured to report a change from the second orientation back to the first orientation only after the smart phone has rotated a predetermined number of degrees clockwise.

If a user is holding the smart phone 110 while moving, such as while walking, jogging, or perhaps riding in a vehicle, the user may end up holding the smart phone 110 in a tilted position that approaches the point at which the orientation sensor(s) will register a change from one orientation to the next. Continued movement can cause the user to frequently tilt the smart phone 110 back and forth past the point at which the orientation sensor(s) report changes between first and second orientations. When this occurs, the display unit may cause the images being displayed on the display screen 120 to rapidly switch back and forth between the first and second orientations. This makes it difficult for the user to view and/or read to the images on the display screen 120.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

Figure 2:
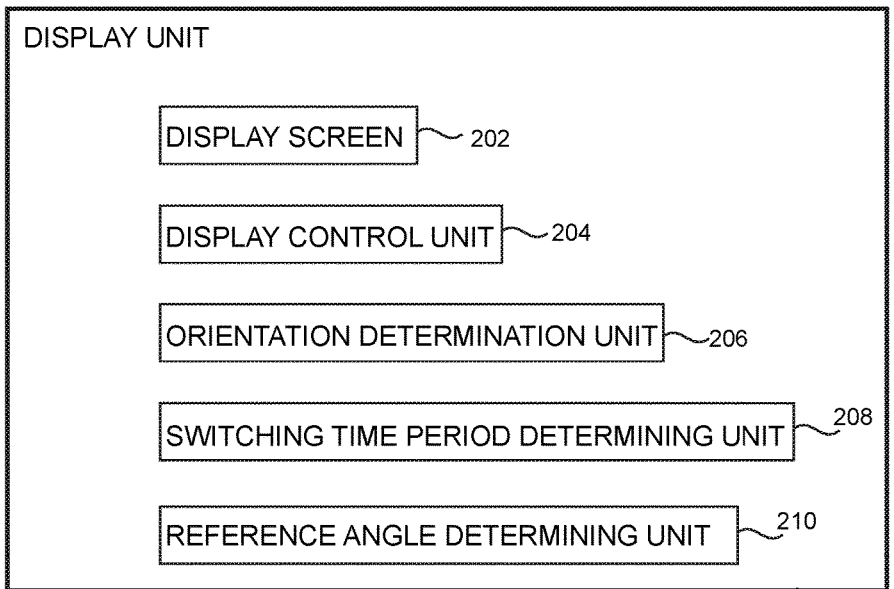
FIG. 2 is block diagram illustrating elements of a display unit of a portable computing device.

FIG. 2 illustrates elements of a display unit 200 that controls the display of images on a display screen of a portable computing device. The portable computing device could be any type of device that is intended to be handheld, and which includes a display screen. This could include portable computers, cellular telephones, smart phones, digital cameras, music players, GPS navigation units, as well as other types of similar devices. Among other things, the display unit 200 is configured to alter the orientation of images on the display screen when a user repositions the portable computing device into a new orientation.

The display unit 200 includes a display screen 202, and a display control unit 204 that is configured to control how images are displayed on the display screen 202. As mentioned above, the display control unit 204 is configured to alter the orientation of images on the display screen 202 when the orientation of the portable computing device itself is changed.

An orientation determining unit 206 is responsible for sensing and reporting the orientation of the portable computing device. The orientation determining unit 206 could include one or more accelerometers which are capable of sensing gravity. Determining the direction in which gravity is acting would help to determine what direction is "up," and what direction is "down" relative to the current orientation of the portable computing device. The orientation determination unit 206 could also include gyroscopes and/or other inertial sensors that are configured to detect movements of the portable computing device as the user repositions the portable computing device. Images appearing on a display screen of a portable computing device are typically displayed in a limited number of orientations on the display screen. The images are usually aligned with edges of a generally rectilinear display screen, and the images usually are only displayed in, at most, four orientations that are separated by 90° of rotation.

In contrast, most portable computing device could be held in almost an infinite number of different orientations. For purposes of determining how to display images on a display screen of the portable computing device, it is usually only necessary to define a limited number of predetermined "orientations" for the portable computing device. The orientation determination unit 206 determines the actual present orientation of the portable computing device, and then determines which of the predetermined orientations corresponds to the actual orientation. The orientation determination unit 206 then reports that predetermined orientation. The display control unit 204 causes images appearing on the display screen 202 to appear in an orientation that corresponds to the predetermined orientation reported by the orientation determination unit 206.

If images are only displayed on the display screen of a portable computing device in four orientations separated by 90° of rotation, it is only necessary to define four corresponding orientations for the portable computing device. For example, the portable computing device illustrated in FIG. 1A could be considered to be in an upright, vertical orientation. If the portable computing device 110 is rotated 180° clockwise, or counterclockwise, from the position illustrated in FIG. 1A, that position could be considered an inverted, vertical orientation. The position illustrated in FIG. 1B could be considered a first horizontal orientation. If the portable computing device 110 is rotated 180° clockwise, or counterclockwise, from the position illustrated in FIG. 1B, that position could be considered a second horizontal orientation.

Having defined four predetermined orientations for the portable computing device 110, the orientation determination unit 206 of the portable computing device would determine the actual orientation of the portable computing device 110 at a given moment in time, and then determine which of the four predetermined orientations corresponds to the actual orientation. In some embodiments, a predetermined orientation could be defined to correspond to a range of actual orientations. For example, the upright, vertical orientation could correspond to the actual orientation illustrated in FIG. 1A, and any other orientation where the portable computing device is rotated clockwise or counterclockwise by 45° or less away from the orientation illustrated in FIG. 1A. The first horizontal orientation could correspond to the actual orientation illustrated in FIG. 1B, and orientations where the portable computing device is rotated clockwise or counterclockwise by 45° or less away from the orientation illustrated in FIG. 1B.

Of course, the actual range of orientations that correspond to each predetermined orientation could vary. For example, the upright vertical orientation could correspond to the actual orientation illustrated in FIG. 1A, and any orientation where the portable computing device is rotated clockwise or counterclockwise by 60° or less away from the orientation illustrated in FIG. 1A. The first horizontal orientation could correspond to the actual orientation illustrated in FIG. 1B, and orientations where the portable computing device is rotated clockwise or counterclockwise by 30° or less away from the orientation illustrated in FIG. 1B. Each predetermined orientation could be defined to correspond to any particular range of actual orientations that make sense for a given portable computing device.

In other embodiments, the orientation determination unit 206 could compare the actual orientation of the portable computing device to the predetermined orientations, and determine which of the predetermined orientations is closest to the actual orientation. The orientation determination unit 206 would then report that predetermined orientation, and the display control unit 204 would cause images to appear on the display screen 202 in an orientation that corresponds to the reported predetermined orientation.

In the following description, there are references to a portable computing device changing its orientation. For example, the portable computing device could change from a first orientation to a second orientation. This actually means that the orientation determination unit 206 has determined that the orientation of the portable computing device has changed such that it is now closer to a second predetermined orientation than a first predetermined orientation.

Figure 1A:
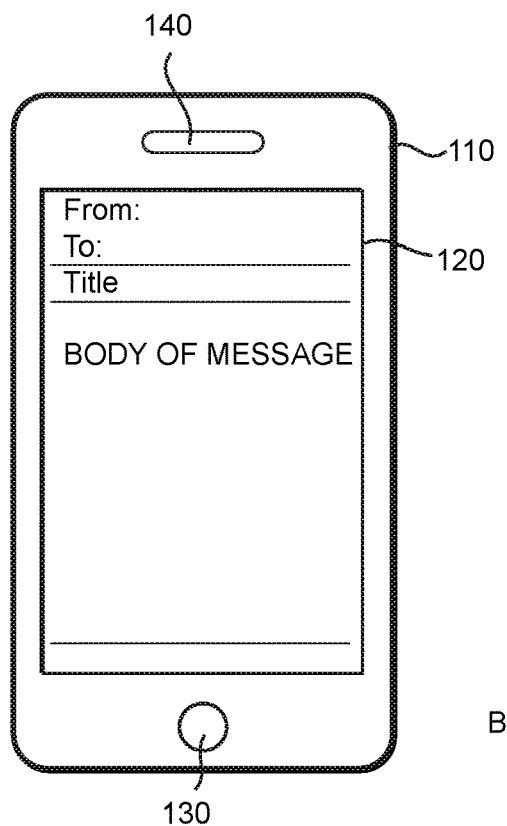
FIGS. 1A and 1B depict a portable computing device in first and second orientations, and illustrate how images on a display screen of the portable computing device can switch from a first orientation to a second orientation when the orientation of the portable computing device itself changes.

For example, if a portable computing device 110 starts in a first predetermined orientation corresponding to the upright vertical position illustrated in FIG. 1A, the portable computing device 110 could change its orientation by small amounts and the orientation determination unit 206 would continue to report that the portable computing device is still in the first predetermined orientation. The orientation determination unit 206 would only report that the portable computing device 110 has moved to a second, different predetermined orientation once the portable computing device has changed its actual orientation such that the actual orientation now falls within a range of orientations that correspond to the second predetermined orientation.

The orientation determining unit 206 may be configured to determine and/or report a change in the orientation of the portable computing device based on the value of an angle formed between the vertical direction and a central longitudinal axis of the portable computing device. The angle formed between the central longitudinal axis and the vertical direction may be determined based on output from inertial sensors such as accelerometers, gyroscopic sensors and the like. In some instances, output from an optical imaging device may also be used to help determine the angle formed between the central longitudinal axis of the portable computing device and the vertical direction.

Once the orientation determining unit 206 knows the angle formed between the vertical direction and the central longitudinal axis of the portable computing device, this angle can be compared to a reference angle to determine the current orientation of the portable computing device. In some embodiments, this reference angle could be a single predetermined reference angle. In other embodiments, the reference angle could be user defined. In still other embodiments, as explained below, several different predetermined reference angles could be used to make a determination as to the current orientation of the portable computing device.

For example, in one embodiment, the predetermined reference angle could be 45°. In such an embodiment, if the angle formed between the vertical direction and a central longitudinal axis of the portable computing device is less than or equal to 45°, the orientation determination unit 206 determines that the portable computing device is in a vertical orientation, and that orientation is reported to the display control unit 204. The display control unit 204 then causes images to be displayed as shown, for example, in FIG. 1A. However, if the angle formed between the vertical direction and a central longitudinal axis of the portable computing device is greater than 45°, the orientation determination unit 206 determines that the portable computing device is in a horizontal orientation, and that orientation is reported to the display control unit 204. The display control unit 204 then causes images to be displayed as shown, for example, in FIG. 1B.

As noted above, the user may have control over the predetermined reference angle which is used to determine if the portable computing device is in the vertical or horizontal orientation. Thus, the user may specify that when the angle formed between the vertical direction and the central longitudinal axis of the portable computing device is between 0° and 60°, the portable computing device should be considered to be in the vertical orientation, and the images should be displayed as illustrated in FIG. 1A. This would mean that the images would only shift to the display illustrated in FIG. 1B when the angle formed between the vertical direction and the central longitudinal axis of the portable computing device exceeds 60°.

As also mentioned above, multiple different predetermined or user specified reference angles could be used to help determine the orientation of the portable computing device. In particular, it could be helpful to use two alternate predetermined reference angles to prevent the images from rapidly switching back and forth between different presentations.

For example, if the portable computing device is configured to use a default first reference angle to determine when the portable computing device switches between orientations, and the portable computing device is rapidly tilting back and forth across that default first reference angle, this would cause the images displayed on the display screen to rapidly switch back and forth between different presentations. Under these circumstances, the portable computing device could switch to a different second reference angle for purposes of determining when the orientation of the portable computing device changes. Use of the second different reference angle would prevent the images from rapidly switching between different presentations. In these embodiments, a reference angle determining unit 210 would determine which of the multiple reference angles to use to determine the orientation of the portable computing device. Such methods are described in greater detail below in conjunction with the flowcharts appearing in FIGS. 6 and 7.

The display unit 200 also includes a switching time period determining unit 208 that is configured to determine how frequently and/or how quickly the user is causing the orientation of the portable computing device to change. The switching time period determining unit 208 could utilize various methods to determine how frequently and/or how quickly the user is causing the orientation of the portable computing device to change, some of which are discussed below. However, the switching time period determining unit 208 could also use other methods which are not described herein. Thus, the description of several methods should in no way be considered limiting of the ways in which the switching time period determining unit 208 could operate.

Figure 3:
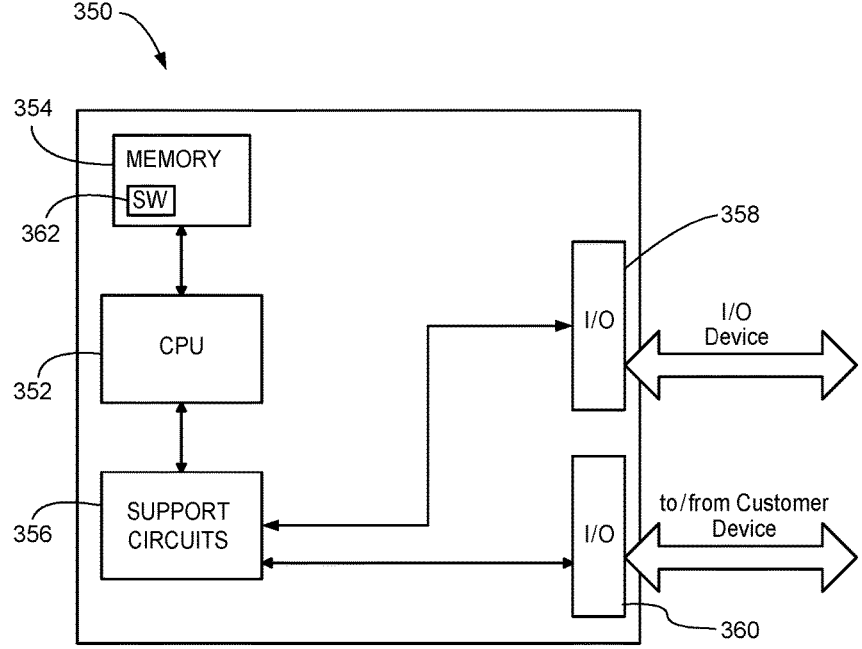
FIG. 3 is a diagram of various elements of a processor that could form part of a display unit of a portable computing device.

FIG. 3 illustrates elements of a computer processor 350 that can be used as part of the display unit 200 of a portable computing device, as illustrated in FIG. 2. The display unit 200, and individual ones of its various elements, could include multiple processors 350, along with their operating components and programming, each carrying out a specific or dedicated portion of the functions performed by the display unit 200.

The processor 350 shown in FIG. 3 may be one of any form of a general purpose computer processor used in accessing an IP-based network, such as a corporate intranet, the Internet or the like. The processor 350 comprises a central processing unit (CPU) 352, a memory 354, and support circuits 356 for the CPU 352. The processor 350 also includes provisions 358/360 for connecting the processor 350 to other elements of the display unit 200, or to other elements of a portable computing device. The provisions 358/360 are shown as separate bus structures in FIG. 3, however, they may alternately be a single bus structure without degrading or otherwise changing the intended operability of the processor 350.

The memory 354 is coupled to the CPU 352. The memory 354, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 356 are coupled to the CPU 352 for supporting the processor in a conventional manner. These circuits include cache, power supplies, clock circuits, input/output circuitry and subsystems, and the like.

A software routine 362, when executed by the CPU 352, causes the processor 350 to perform processes of the disclosed embodiments, and is generally stored in the memory 354. The software routine 362 may also be stored and/or executed by a second CPU (not shown) that is remotely located from the hardware being controlled by the CPU 352. Also, the software routines could also be stored remotely from the CPU. For example, the software could be resident on servers and memory devices that are located remotely from the CPU, but which are accessible to the CPU via a data network connection.

The software routine 362, when executed by the CPU 352, transforms the general purpose computer into a specific purpose computer that performs one or more functions of a display unit 200, or an element of a display unit 200. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 362 of the disclosed embodiments is capable of being executed on any computer operating system, and is capable of being performed using any CPU architecture.

The switching time period determining unit 208 of the display unit 200 illustrated in FIG. 2 utilizes input from the orientation determining unit 206 to determine how frequently the orientation of a portable computing device is changing for the purpose of determining how rapidly the display control unit 204 should cause the orientation of images on the display screen 202 to change. If the orientation of the portable computing device only changes infrequently, then the display control unit 204 will cause images on the display screen 202 to change orientation quickly after the orientation of the portable computing device changes. However, if the orientation of the portable computing device is changing relatively rapidly, perhaps changing back and forth between first and second orientations on a frequent basis, in some embodiments, the display control unit 204 will delay changing the orientation of the images on the display screen 202 for a certain period of time after each change in orientation of the portable computing device. This is done because rapid changes in the orientation of the portable computing device may mean that the user is moving, such as walking, jogging, or perhaps riding in a vehicle. The rapid orientation changes may not be deliberate. If the orientation of the images on the display screen 202 is quickly switched back and forth between first and second orientations each time that the portable computing device itself moves between first and second orientations, the rapid changes in the orientation of the images may make it difficult for the user to view and understand the images. To make it easier for the user to view the images on the display screen 202, the display control unit 204 deliberately delays changing the orientation of the images on the display screen 202 for a certain period of time after each sensed change in the orientation of the portable computing device. For example, if the switching time period determining unit 208 indicates that the portable computing device is rapidly transitioning back and forth between first and second orientations, and the orientation determining unit 206 notes that the portable computing device just switched from the first orientation to the second orientation, the display control unit 204 delays changing the orientation of the images on the display screen 202 from a corresponding first orientation to a corresponding second orientation. If the portable computing device then moves back into the first orientation before the delay period expires, the images always remain in the first orientation on the display screen 202, which can make it easier for the user to read and understand the images.

In other embodiments, when the portable computing device is rapidly transitioning back and forth between two orientations, instead of delaying the time at which images on the display screen 202 are changed from a first presentation orientation to a second presentation orientation, the portable computing device may instead be configured to re-define what constitutes a change in orientation, to thereby avoid rapid changes in the orientation of the images on the display screen 120.

For example, if the orientation determination unit 206 is configured to determine that the orientation of the portable computing device changes from a vertical orientation to a horizontal orientation when the angle between the vertical direction and a central longitudinal axis of the portable computing device exceeds 45°, and the user is causing the portable computing device to be tilted back and forth across the 45° point on a rapid basis, the reference angle determining unit 210 may instruct the orientation determination unit 206 to replace the 45° reference angle transition point with a larger reference angle, such as a 50° reference angle or perhaps a 60° reference angle. Once that change is made, the user could cause the portable computing device to tilt back and forth across the 45° reference angle point, and so long as the portable computing device is not transitioning back and forth across the larger new reference angle, the orientation determining unit 206 will not report a change in orientation. As a result, the display control unit 204 would continue to cause images to be displayed on the display screen 120 in the vertical orientation, as illustrated in FIG. 1A.

Figure 1B:
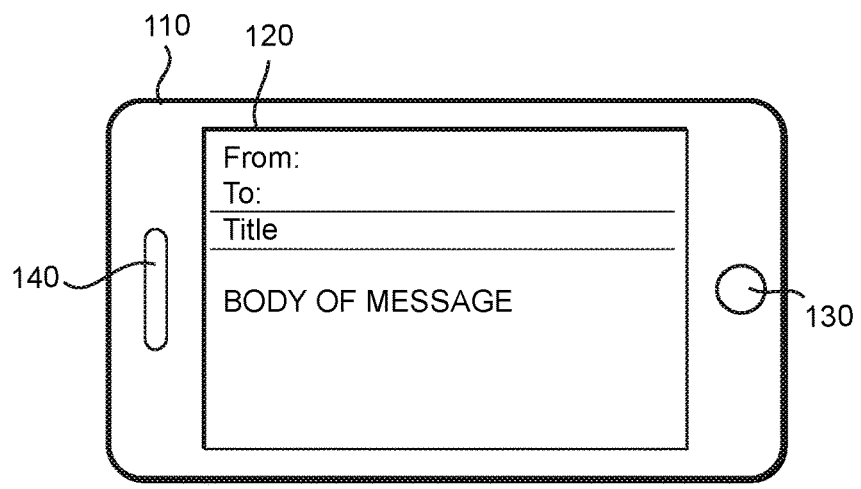

Of course, in alternate embodiments, rather than temporarily increasing the size of the reference angle which defines a change from a vertical orientation to a horizontal orientation, the reference angle determining unit 210 could instruct the orientation determination unit 206 to temporarily use a smaller reference angle. In the example provided above, if the portable computing device is being rapidly tilted back and forth across the 45° angle, the reference angle determining unit 210 could instruct the orientation determination unit 206 use to smaller reference angle, such as 40° or perhaps 30°. Under these circumstances, if the portable computing device is rapidly tilting back and forth across the 45° point, so long as the portable computing device is not tilting back under the new smaller reference angle, the orientation determining unit 206 will report that the portable computing device is in the horizontal orientation, and images will be displayed on the display screen 120 as illustrated in FIG. 1B.

Figure 4:
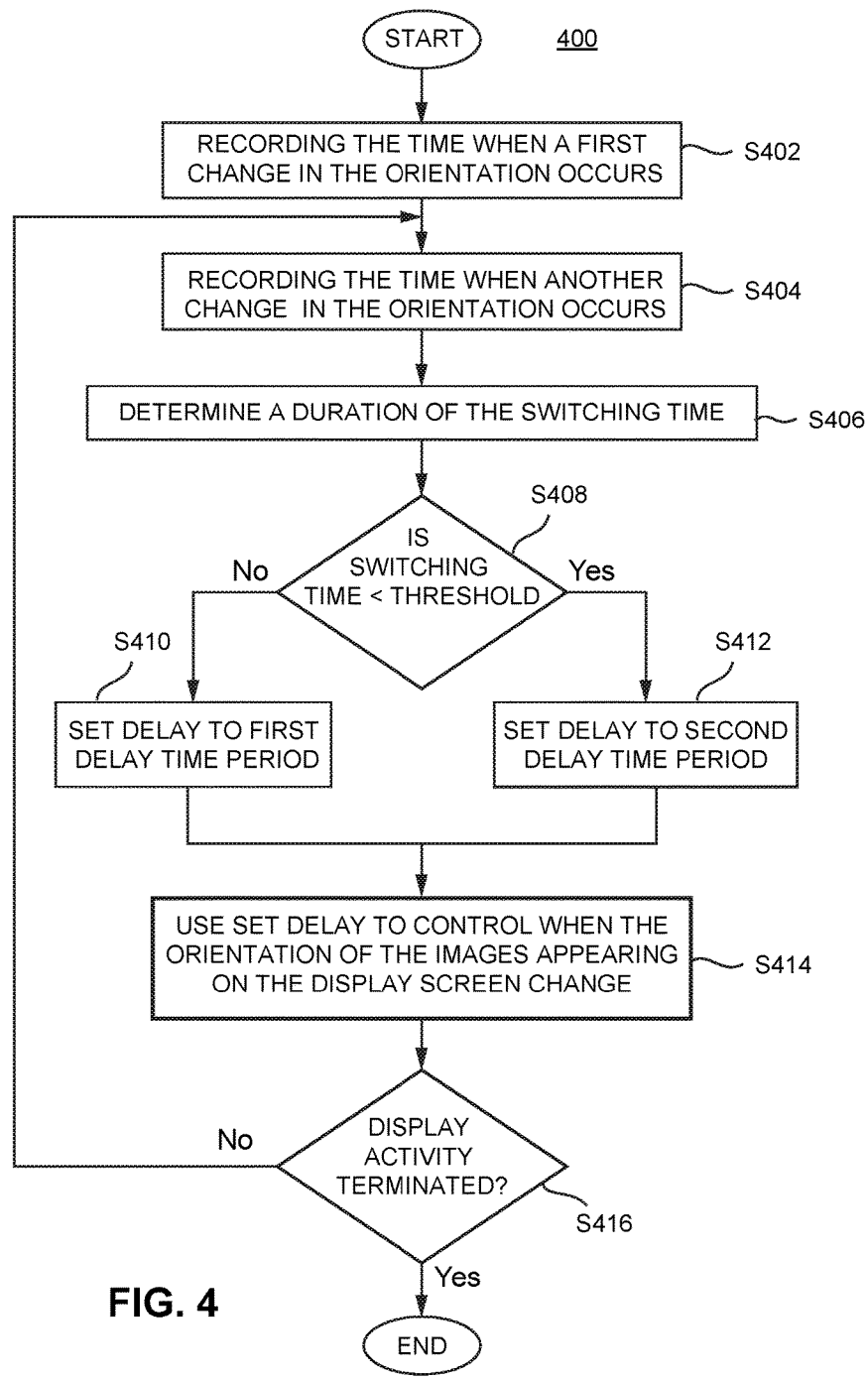
FIG. 4 is a flowchart illustrating steps of a first method for controlling how images are displayed on a display screen of a portable computing device.

FIG. 4 illustrates steps of a first method that would be performed by a display unit 200 as illustrated in FIG. 2 to control how images are displayed on a display screen. The method 400 begins and proceeds to step S402, wherein the switching time period determining unit 208 records the time at which a first change in the orientation of a portable computing device occurs. As explained above, a change in orientation occurs not when the actual orientation of the portable computing device changes, but rather when the orientation determination unit 406 determines that the orientation of the portable computing device has changed such that the actual orientation of the portable computing device no longer corresponds to a first predetermined orientation, and instead now corresponds to a second predetermined orientation.

In step S404, the switching time period determining unit 208 records the time at which another change in the orientation of a portable computing device occurs. This could be a change back to the original orientation, or a change to yet a new orientation. In step S406, the switching time period determining unit 208 determines the duration of a switching time period that elapsed between the last two changes in the orientation of the portable computing device.

In step S408, a check is performed to determine whether the switching time period is less than a threshold time period. If the switching time period is greater than the threshold time period, indicating that the orientation of the portable computing device is changing relatively slowly, in step S410 a delay time period is set to a first value. If the switching time period is less than the threshold time period, indicating the portable computing device is changing orientation relatively rapidly, in step S412 the delay time period is sent to a second value which is greater than the first value.

The delay time period is used by the display control unit 204 in step S414 to determine how rapidly to change the orientation of images appearing on a display screen 202. When the first delay time period is used, the orientation of the images on the display screen is quickly changed each time the orientation of the portable computing device changes to match the change in the orientation of the portable computing device itself. In fact, in some embodiments, the first delay time period may be equal to zero.

On the other hand, when the second delay time period is being used, because the orientation of the portable computing device is changing relatively rapidly, the display control unit 204 deliberately waits for a certain period of time, equal to the amount of the second delay time period, after each change in the orientation of the portable computing device before changing the orientation of the images on the display screen 202. As explained above, this may help a user to view and understand the images on the display screen.

In some embodiments, the first and second delay time periods may be pre-set for a particular display unit 200 and/or portable computing device incorporating the display unit 200. In other embodiments, one or both of the first and second delay time periods may be adjustable based on user input. Similarly, the threshold used in step S408 could be preset, or it could be adjustable based on user input.

The method then proceeds to step S416, where a check is performed to determine if display activity has been terminated. This could occur because the portable computing device is being turned off. This also could occur if the user has not performed any activity for a certain period of time, and the display unit is switched into a power saving mode in which images are no longer displayed. If display activity is terminated, the method ends. If not, the method loops back to step S404, and the steps described above are repeated.

Figure 5:
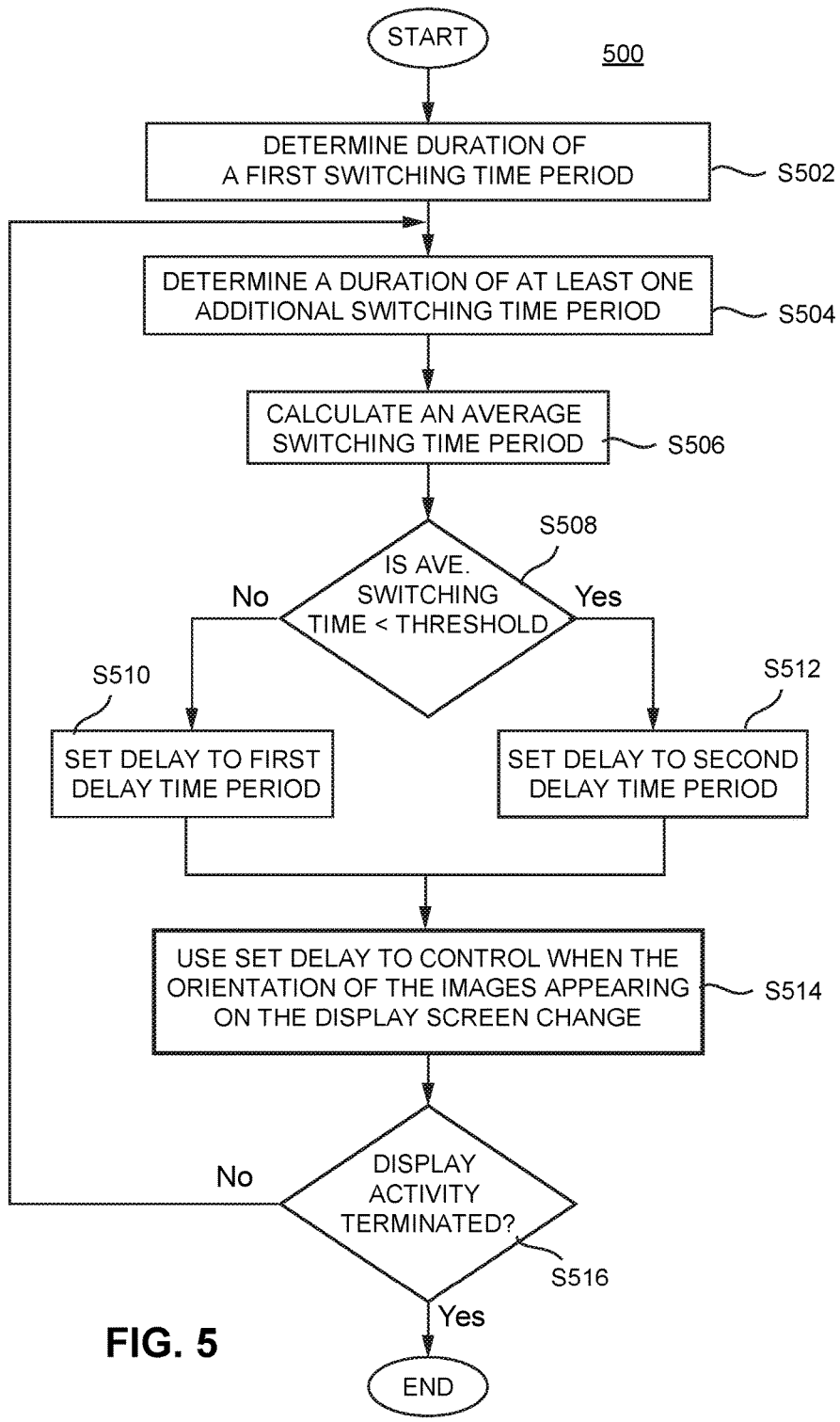
FIG. 5 is a flowchart illustrating steps of a second method for controlling how images are displayed on a display screen of a portable computing device.

FIG. 5 illustrates steps of another method for controlling the display of images on a display screen. The method 500 begins and proceeds to step S502, where the switching time period determining unit 208 of a display unit 200 determines the duration of a first switching time period. The switching time period is the duration of time period that elapses between the first time that a portable computing device changes its orientation and the next time that the portable computing device changes its orientation. The length of the first switching time period could be determined as described above in connection with method illustrated in FIG. 4, or using an alternate method. For example, the switching time period determining unit 208 could start a timer the first time that the orientation of a portable computing device changes, and then stop the timer the next time that the portable computing device changes its orientation. Of course, any other method could also be used to determine the length of the first switching time period.

In step S504, the switching time period determining unit 208 of the display unit 200 determines the duration of at least one additional, subsequent switching time period. In some embodiments, step S504 could involve determining the duration of just one additional switching time period. In alternate embodiments, step S504 could involve determining the durations of multiple subsequent switching time periods.

In step S506, the values of multiple switching time periods are averaged to generate an average switching time period. In some embodiments, the average switching time period could be calculated based on a predetermined number of switching time periods that were determined in steps S502 and/or S504. For example, the average switching time period could be based on the last two determined switching time periods, or the last three determined switching time periods.

In alternate embodiments, the average switching time period could be based on any determined switching time periods that were determined within a predetermined time window. For example, the average switching time period could be calculated based on any switching time periods that were determined within the last 60 seconds. If only one switching time period was calculated within the last 60 seconds, then that switching time period would become the average switching time period. If no changes in orientation were sensed within the last 60 seconds, there would be no switching time periods to use to calculate the average switching time period, in which case the average switching time period could be set to a predetermined large number which is greater than the threshold time period discussed below.

In step S508, a check is performed to determine whether the average switching time period is less than a threshold time period. If the average switching time period is greater than the threshold time period, indicating that the orientation of the portable computing device is changing relatively slowly, in step S510 a delay time period is set to a first value. If the average switching time period is less than the threshold time period, indicating the portable computing device is changing orientation relatively rapidly, in step S512 the delay time period is sent to a second value which is greater than the first value.

In step S514, the delay time period that has been set is used to control how rapidly the orientation of images on a display screen are changed after each change in the orientation of the portable computing device itself. The method then proceeds to step S516, where a check is performed to determine if display activity has been terminated. If display activity is terminated, the method ends. If not, the method loops back to step S504, and the steps described above are repeated.

Figure 6:
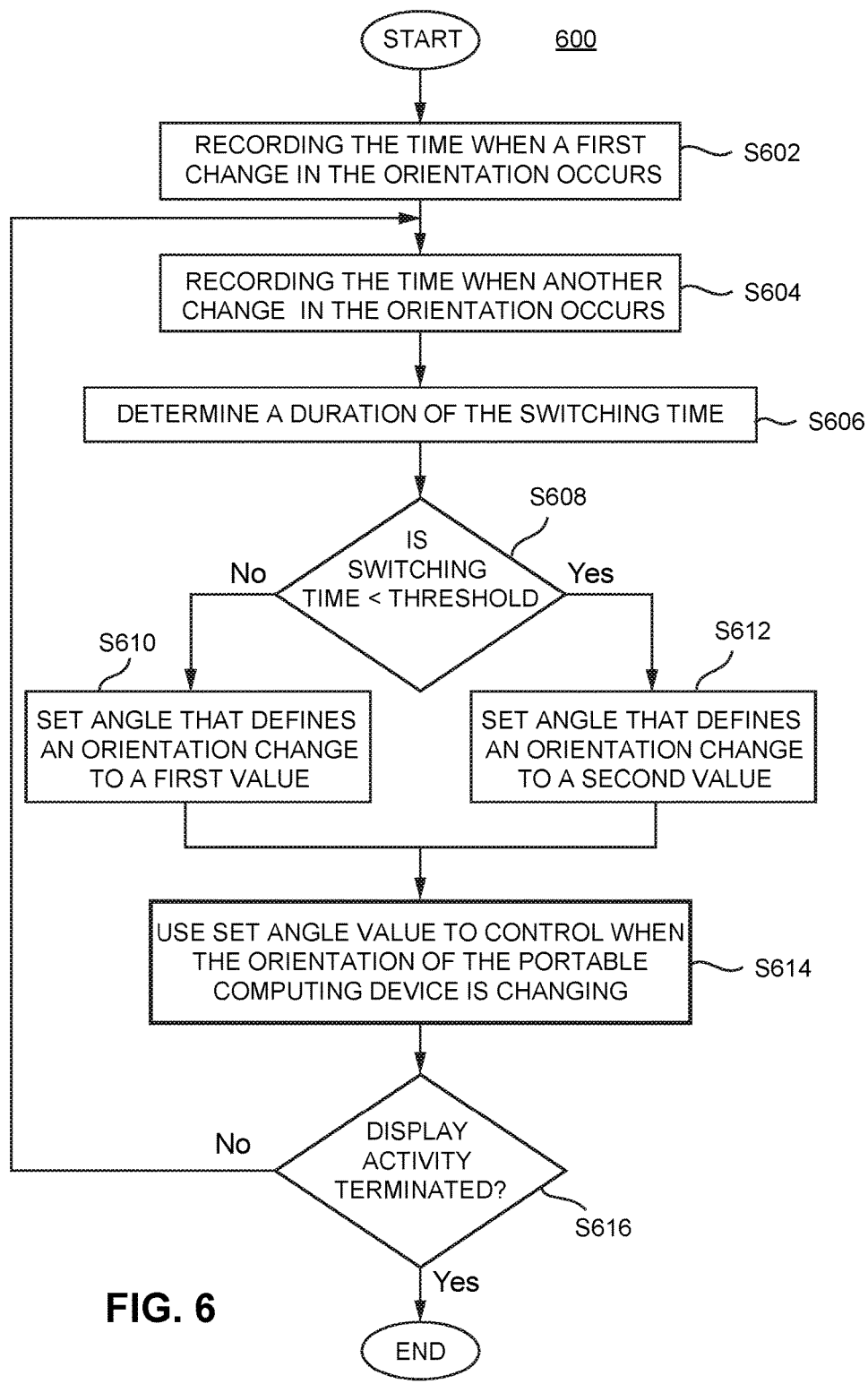
FIG. 6 is a flowchart illustrating steps of a third method for controlling how images are displayed on a display screen of a portable computing device.

FIG. 6 illustrates steps of a third method that would be performed by a display unit 200 as illustrated in FIG. 2 to control how images are displayed on a display screen. The method 600 begins and proceeds to step S602, wherein the switching time period determining unit 208 records the time at which a first change in the orientation of a portable computing device occurs. As explained above, a change in orientation occurs not when the actual orientation of the portable computing device changes, but rather when the orientation determination unit 406 determines that the orientation of the portable computing device has changed such that the actual orientation of the portable computing device no longer corresponds to a first predetermined orientation, and instead now corresponds to a second predetermined orientation. This occurs when an angle formed between the vertical direction and a central longitudinal axis of the portable computing device exceeds a predetermined reference angle.

In step S604, the switching time period determining unit 208 records the time at which another change in the orientation of a portable computing device occurs. This could be a change back to the original orientation, or a change to yet a new orientation. In step S606, the switching time period determining unit 208 determines the duration of a switching time period that elapsed between the last two changes in the orientation of the portable computing device.

In step S608, a check is performed to determine whether the switching time period is less than a threshold time period. If the switching time period is greater than the threshold time period, indicating that the orientation of the portable computing device is changing relatively slowly, in step S610 a reference angle that defines when the portable computing device changes from a first orientation to a second orientation is set to a first value. If the switching time period is less than the threshold time period, indicating the portable computing device is changing orientation relatively rapidly, in step S612 a reference angle that defines when the portable computing device changes from a first orientation to a second orientation is set to a second value. That second value could be larger than or smaller than the first value.

In step S614, the set angle value is then used to determine when the portable computing device changes from a first orientation to a second orientation. As explained above, if the portable computing device is rapidly tilting back and forth across a first reference angle, changing the reference angle value to be larger or smaller than a first default value, can prevent the images from being rapidly switched back and forth between different display orientations.

In some embodiments, the first and second reference angle values may be pre-set for a particular display unit 200 and/or portable computing device incorporating the display unit 200. In other embodiments, one or both of the first and second reference angle values may be adjustable based on user input. Similarly, the threshold used in step S608 could be preset, or it could be adjustable based on user input.

The method then proceeds to step S616, where a check is performed to determine if display activity has been terminated. This could occur because the portable computing device is being turned off. This also could occur if the user has not performed any activity for a certain period of time, and the display unit is switched into a power saving mode in which images are no longer displayed. If display activity is terminated, the method ends. If not, the method loops back to step S604, and the steps described above are repeated.

In some embodiments, if the reference angle value has been changed from a first default value to a second value, when the method ends, the reference angle value may be switched back to the first default value.

Figure 7:
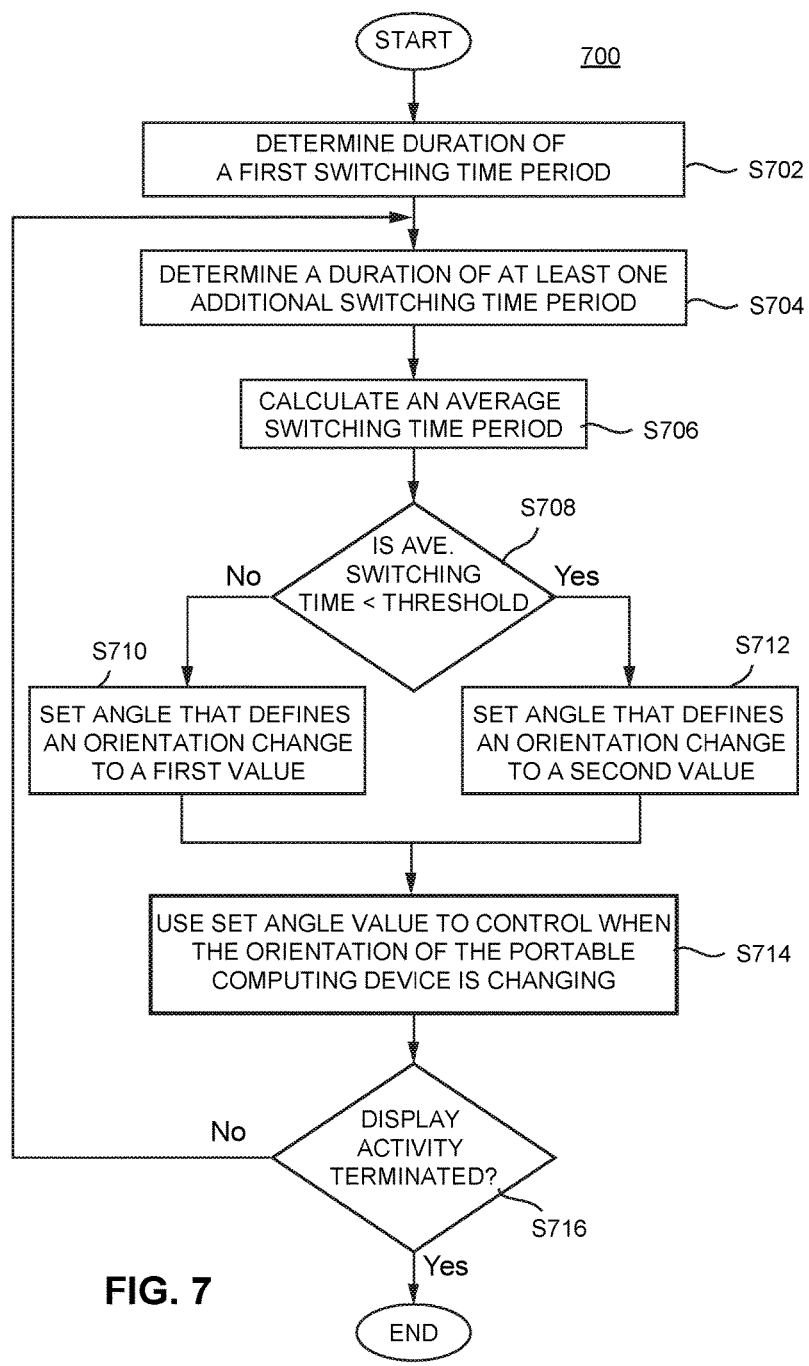
FIG. 7 is a flowchart illustrating steps of a fourth method for controlling how images are displayed on a display screen of a portable computing device.

FIG. 7 illustrates steps of another method for controlling the display of images on a display screen. The method 700 begins and proceeds to step S702, where the switching time period determining unit 208 of a display unit 200 determines the duration of a first switching time period. The switching time period is the duration of time period that elapses between the first time that a portable computing device changes its orientation and the next time that the portable computing device changes its orientation. The length of the first switching time period could be determined as described above in connection with method illustrated in FIG. 4, or using an alternate method. For example, the switching time period determining unit 208 could start a timer the first time that the orientation of a portable computing device changes, and then stop the timer the next time that the portable computing device changes its orientation. Of course, any other method could also be used to determine the length of the first switching time period.

In step S704, the switching time period determining unit 208 of the display unit 200 determines the duration of at least one additional, subsequent switching time period. In some embodiments, step S704 could involve determining the duration of just one additional switching time period. In alternate embodiments, step S704 could involve determining the durations of multiple subsequent switching time periods.

In step S706, the values of multiple switching time periods are averaged to generate an average switching time period. In some embodiments, the average switching time period could be calculated based on a predetermined number of switching time periods that were determined in steps S702 and/or S704. For example, the average switching time period could be based on the last two determined switching time periods, or the last three determined switching time periods.

In alternate embodiments, the average switching time period could be based on any determined switching time periods that were determined within a predetermined time window. For example, the average switching time period could be calculated based on any switching time periods that were determined within the last 60 seconds. If only one switching time period was calculated within the last 60 seconds, then that switching time period would become the average switching time period. If no changes in orientation were sensed within the last 60 seconds, there would be no switching time periods to use to calculate the average switching time period, in which case the average switching time period could be set to a predetermined large number which is greater than the threshold time period discussed below.

In step S708, a check is performed to determine whether the average switching time period is less than a threshold time period. If the average switching time period is greater than the threshold time period, indicating that the orientation of the portable computing device is changing relatively slowly, in step S710 a reference angle for defining when the portable computing device changes from a first orientation to a second orientation is set to a first value. If the average switching time period is less than the threshold time period, indicating the portable computing device is changing orientation relatively rapidly, in step S712 the reference angle is set to a second value. That second value could be larger than or smaller than the first value.

In step S714, the set value for the reference angle is then used to determine when the orientation of the portable computing device is changing. The method then proceeds to step S716, where a check is performed to determine if display activity has been terminated. If display activity is terminated, the method ends. If not, the method loops back to step S704, and the steps described above are repeated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination."

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of controlling the orientation of images on a display screen of a portable computing device that is configured to display images in different orientations on the display screen when the portable computing device is positioned in corresponding different orientations, comprising:

determining a duration of a switching time period that elapses between a first point in time at which the portable computing device changes from a first orientation to a second orientation, and a second point in time at which the portable computing device changes from the second orientation back to the first orientation, wherein the portable computing device is determined to have changed from the first orientation to the second orientation when an angle between the vertical direction and a central longitudinal axis of the portable computing device exceeds a reference angle and wherein the portable computing device is determined to have changed from the second orientation back to the first orientation when an angle between the vertical direction and the central longitudinal axis of the portable computing device becomes less than the reference angle; and setting the reference angle to a first value when the determined duration of the switching time period is greater than or equal to a threshold duration and setting the value of the reference angle to a second value that is different from the first value when the determined duration of the switching time period is less than the threshold duration, wherein a subsequent determination of when the portable computing device changes between the first and second orientations will be based on the set reference angle.

2. The method of claim 1, wherein the determining and setting steps are repeated on a periodic basis.

3. The method of claim 1, wherein the second value is greater than the first value.

4. The method of claim 1, wherein the second value is smaller than the first value.

5. A method of controlling the orientation of images on a display screen of a portable computing device that is configured to display images in different orientations on the display screen when the portable computing device is positioned in corresponding different orientations, comprising:

A) determining a duration of a first switching time period that elapses between a first point in time at which the portable computing device changes from a first orientation to a second orientation, and a second point in time at which the portable computing device changes from the second orientation back to the first orientation, wherein the portable computing device is determined to have changed from the first orientation to the second orientation when an angle between the vertical direction and a central longitudinal axis of the portable computing device exceeds a reference angle and wherein the portable computing device is determined to have changed from the second orientation back to the first orientation when an angle between the vertical direction and the central longitudinal axis of the portable computing device becomes less than the reference angle;

B) determining a duration of a subsequent switching time period that elapses before the portable computing device again changes its orientation;

C) calculating an average switching time period based on one or more determined switching time periods; and D) setting the reference angle to a first value when a duration of the calculated average switching time period is greater than or equal to a threshold duration and setting the value of the reference angle to a second value that is different from the first value when the duration of the calculated average switching time period is less than the threshold duration, wherein a subsequent determination of when the portable computing device changes between the first and second orientations will be based on the set reference angle.

6. The method of claim 5, wherein steps B and C are repeated on a periodic basis to calculate a new average switching time period, and wherein step D is performed based on the newly calculated average switching time period after each repetition of steps B and C.

7. The method of claim 5, wherein the average switching time period is calculated based on a predetermined number of determined switching time periods.

8. The method of claim 5, wherein the average switching time period is calculated based on a plurality of determined switching time periods.

9. The method of claim 5, wherein the average switching time period is based on any switching time periods that were determined within a predetermined time window.

10. A system for controlling the orientation of images on a display screen of a portable computing device that is configured to display images in different orientations on the display screen when the portable computing device is positioned in corresponding different orientations, comprising:

means for determining a duration of a switching time period that elapses between a first point in time at which the portable computing device changes from a first orientation to a second orientation, and a second point in time at which the portable computing device changes from the second orientation back to the first orientation, wherein the portable computing device is determined to have changed from the first orientation to the second orientation when an angle between the vertical direction and a central longitudinal axis of the portable computing device exceeds a reference angle and wherein the portable computing device is determined to have changed from the second orientation back to the first orientation when an angle between the vertical direction and the central longitudinal axis of the portable computing device becomes less than the reference angle; and means for setting the reference angle to a first value when the determined duration of the switching time period is greater than or equal to a threshold duration and for setting the value of the reference angle to a second value that is different from the first value when the determined duration of the switching time period is less than the threshold duration, wherein a subsequent determination of when the portable computing device changes between the first and second orientations will be based on the set reference angle.

11. A system for controlling the orientation of images on a display screen of a portable computing device that is configured to display images in different orientations on the display screen when the portable computing device is positioned in corresponding different orientations, comprising:

a switching time period determining unit that determines a duration of a switching time period that elapses between a first point in time at which the portable computing device changes from a first orientation to a second orientation, and a second point in time at which the portable computing device changes from the second orientation back to the first orientation, wherein the portable computing device is determined to have changed from the first orientation to the second orientation when an angle between the vertical direction and a central longitudinal axis of the portable computing device exceeds a reference angle and wherein the portable computing device is determined to have changed from the second orientation back to the first orientation when an angle between the vertical direction and the central longitudinal axis of the portable computing device becomes less than the reference angle; and a reference angle determining unit that sets the reference angle to a first value when the determined duration of the switching time period is greater than or equal to a threshold duration and that sets the value of the reference angle to a second value that is different from the first value when the determined duration of the switching time period is less than the threshold duration, wherein a subsequent determination of when the portable computing device changes between the first and second orientations will be based on the set reference angle.

12. The system of claim 11, wherein the second value is greater than the first value.

13. The system of claim 11, wherein the second value is smaller than the first value.

14. A non-transitory computer readable medium that stores instructions which, when executed by one or more processors of a display unit of a portable computing device, cause the display unit to perform a method of controlling the orientation of images appearing on a display screen of the portable computing device, the method comprising:

determining a duration of a switching time period that elapses between a first point in time at which the portable computing device changes from a first orientation to a second orientation, and a second point in time at which the portable computing device changes from the second orientation back to the first orientation, wherein the portable computing device is determined to have changed from the first orientation to the second orientation when an angle between the vertical direction and a central longitudinal axis of the portable computing device exceeds a reference angle and wherein the portable computing device is determined to have changed from the second orientation back to the first orientation when an angle between the vertical direction and the central longitudinal axis of the portable computing device becomes less than the reference angle; and setting the reference angle to a first value when the determined duration of the switching time period is greater than or equal to a threshold duration and setting the value of the reference angle to a second value that is different from the first value when the determined duration of the switching time period is less than the threshold duration, wherein a subsequent determination of when the portable computing device changes between the first and second orientations will be based on the set reference angle.

* * * * *